United States Patent

Rizk et al.

Patent Number: 5,817,860
Date of Patent: Oct. 6, 1998

[54] POLYURETHANE PREPOLYMER COMPOSITIONS, FOAMS MADE THEREFROM AND METHODS OF MAKING EACH THEREOF

[75] Inventors: Sidky D. Rizk, Westfield, N.J.; Jerry Lynn Spradling, Frankenmuth; Brad A. Pearson, Shelby Twp., both of Mich.

[73] Assignee: Essex Specialty Products, Inc., Auburn Hills, Mich.

[21] Appl. No.: 45,032

[22] Filed: Mar. 20, 1998

[51] Int. Cl.$^6$ .......................... C07C 26/00; C07C 249/00; C08G 18/10
[52] U.S. Cl. .............................. 560/25; 521/159; 560/26; 560/115; 560/158; 560/330; 560/359
[58] Field of Search .............................. 521/159; 560/25, 560/26, 115, 158, 330, 359

[56] References Cited

U.S. PATENT DOCUMENTS

| | | | |
|---|---|---|---|
| 4,052,347 | 10/1977 | Dieterich et al. | 260/2.5 AK |
| 4,355,138 | 10/1982 | Markusch et al. | 525/127 |
| 4,855,490 | 8/1989 | Markusch et al. | 560/355 |
| 4,864,025 | 9/1989 | Robin et al. | 544/222 |
| 4,888,442 | 12/1989 | Dunlap et al. | 560/352 |
| 4,904,522 | 2/1990 | Markusch | 428/288 |
| 4,910,332 | 3/1990 | Kahl et al. | 860/351 |
| 4,963,675 | 10/1990 | Robin et al. | 544/222 |
| 5,350,777 | 9/1994 | Yuge et al. | 521/159 |
| 5,356,943 | 10/1994 | Dueber et al. | 521/124 |
| 5,461,091 | 10/1995 | Hoffmann et al. | 523/415 |
| 5,574,124 | 11/1996 | Schmalstieg et al. | 528/59 |

FOREIGN PATENT DOCUMENTS

| | | |
|---|---|---|
| 0 393 903 | 10/1990 | European Pat. Off. . |
| 96/06124 | 2/1996 | WIPO . |

*Primary Examiner*—Morton Foelak

[57] ABSTRACT

A polyisocyanate prepolymer composition is comprised of the reaction product of (a) a polyisocyanate having an average functionality of at least 2 and containing at least about 20 percent by weight of a diisocyanate monomer, (b) a monohydric alcohol and (c) a polyol having an average hydroxyl functionality of at least about 1.8 to at most about 3.2 wherein the prepolymer composition has (i) an amount of isocyanate groups by weight sufficient to react with water in the absence of a supplemental blowing agent to make a foam, (ii) at most about 10.0 percent by weight of the diisocyanate monomer and (iii) an amount of the polyisocyanate that is capped by the monohydric alcohol sufficient to prevent gelling of the prepolymer composition. The prepolymer composition may be reacted with water to form a polyurethane foam.

25 Claims, No Drawings

5,817,860

POLYURETHANE PREPOLYMER COMPOSITIONS, FOAMS MADE THEREFROM AND METHODS OF MAKING EACH THEREOF

FIELD OF THE INVENTION

The invention is directed to polyurethane foams. In particular, the invention is directed to polyisocyanate prepolymers for making polyurethane foams.

BACKGROUND OF THE INVENTION

Polyurethanes are formed by the reaction of a polyisocyanate compound, such as toluene diisocyanate (TDI) or diphenylmethane diisocyanate (MDI) with a polyhydroxyl compound, such as a polyol. Generally, streams of approximately equal volume of the polyol and polyisocyanate are intermixed in a mixing head and then dispensed into a cavity or mold. In the mold or cavity, the hydroxyls of the polyol and isocyanates of the polyisocyanate react to form the polyurethane, while simultaneously water added to the polyol reacts with the isocyanates to provide $CO_2$ in situ that causes the polyurethane to foam. Since isocyanates readily react with water, they are generally known to be an irritant and can be toxic when inhaled.

Prepolymers have been used in place of polyisocyanates to decrease the amount of vaporous isocyanate when making polyurethane foams. Prepolymers generally are made by reacting a diol with a diisocyanate monomer (e.g., MDI or TDI) at a great excess of NCO (i.e., isocyanate) to OH (i.e., hydroxyl). Commonly, the NCO to OH equivalence ratio is well in excess of 5. The ratio is large to keep the prepolymer from gelling while still providing enough NCO to produce a foam. As a consequence of the large NCO to OH ratio, a significant amount of diisocyanate monomer (e.g., MDI), typically, is still present in the prepolymer.

Generally, when making foams from these prepolymers, a gas blowing agent, such as a chlorofluorocarbon, is used to froth the prepolymer and ambient moisture reacts with the prepolymer to form polyurethane. Since ambient moisture causes the urethane reaction to proceed (i.e., formation of urea linkages and amines), foams of this sort suffer from inconsistencies depending on ambient humidity. Thick foams made by this method also tend to collapse as they cure. The foam collapses because an insufficient amount of water penetrates through the outer portion of the foam into the interior of the mass to adequately cure (i.e., cross-link) the interior of the foam.

More recently, International Patent Application No. 96/06124 has described prepolymers that have attempted to decrease the amount of diisocyanate monomer when making a foam. The 96/06124 application describes forming a prepolymer by reacting a polyisocyanate having an isocyanate functionality of 2.3 to 3.7 and having a diisocyanate monomer content of less than 20 percent by weight of the polyisocyanate with a polyol at high NCO to OH ratios (e.g., 4.6). The 96/06124 application also describes, when making a foam from these prepolymers, a blowing agent, such as a dimethylether, is used. Thus, this reference describes a technique of making a prepolymer with a low diisocyanate monomer concentration by starting with a polyisocyanate having a low concentration of disocyanate monomer initially. This technique suffers from the need to use a polyisocyanate that must have a low diisocyanate monomer content initially, which may require, for example, expensive distillation or reaction processes to form said polyisocyanate. These prepolymers also require a gaseous blowing agent (e.g., CFCs) when making a foam.

Thus, it would be desirable to provide a prepolymer composition, method to form the prepolymer composition, foam made from the prepolymer composition and method to make the foam that avoids one or more of deficiencies of the prior art, such as one of those described above.

SUMMARY OF THE INVENTION

A first aspect of the present invention is a polyisocyanate prepolymer composition comprising the reaction product of (a) an organic polyisocyanate having an average isocyanate functionality of at least 2 and containing at least about 20% by weight of a diisocyanate monomer, (b) a monohydric alcohol and (c) a polyol having an average hydroxyl functionality of at least about 1.8 to at most about 3.2, wherein the prepolymer composition has (i) an amount of isocyanate groups by weight sufficient to react with water in the absence of a supplemental blowing agent to make a foam, (ii) at most about 10.0 percent by weight of the diisocyanate monomer and (iii) an amount of the polyisocyanate that is capped by the monohydric alcohol sufficient to prevent gelling of the prepolymer composition.

A second aspect of the invention is a method of forming a prepolymer polyisocyanate composition for preparing polyurethane foams, the method comprises:

contacting (i) an organic polyisocyanate having an average isocyanate functionality of at least about 2 and an amount of diisocyanate monomer of at least 20% by weight, (ii) a monohydric alcohol and (iii) a polyol having an average hydroxyl functionality of at least about 1.8 to at most about 3.2 for a time and temperature sufficient to form the prepolymer composition, wherein the organic polyisocyanate, monohydric alcohol and polyol are contacted at a ratio of NCO to hydroxyl, of at least about 2 to at most about 5, and the monohydric alcohol and polyol are provided in a ratio of monohydric alcohol to polyol, of at least about 0.1 to at most about 2, based upon the hydroxyl equivalents of the monohydric alcohol and polyol.

The prepolymer polyisocyanate composition surprisingly may be made with a low NCO:OH ratio (i.e., about 2 to 5) due to the discovery of the beneficial effect of the monohydric alcohol added in a specific ratio with the polyol. Consequently, a prepolymer composition may be formed that avoids gelation and has a low diisocyanate monomer content while still providing sufficient amounts of NCO (i.e., isocyanate groups) to form a foam in situ (i.e., from the reaction of water with NCO of the prepolymer composition). The amount of diisocyanate monomer still remaining (i.e., residual) in the prepolymer composition after forming may be so small that little or no special ventilation (e.g., ventilation hoods) or protective breathing apparatus (e.g., half mask chemical respirators) may be required when making a foam therefrom.

In addition, a third aspect of the invention is a method of forming a polyurethane foam comprising contacting the prepolymer composition of the first aspect with a foaming reactant comprised of water for a time and temperature sufficient to form the polyurethane foam. In particular, a foam may be formed wherein essentially the only blowing agent is $CO_2$ produced by the reaction of the NCO groups of the prepolymer composition and the water of the foaming reactant.

Finally, a fourth aspect of the invention is a foam comprising a continuous cellular matrix reaction product of water and the polyisocyanate prepolymer composition of the first aspect.

The prepolymer composition may be used to make, among other things, polyurethane foams useful as adhesives, sealants, coatings, insulative coatings, membranes and acoustical baffles for use in the automotive industry.

DETAILED DESCRIPTION OF THE INVENTION

The Prepolymer Composition

The polyisocyanate prepolymer composition comprises the reaction product of (a) an organic polyisocyanate having an average functionality of at least about 2 and containing at least about 20 percent by weight of a diisocyanate monomer, (b) a monohydric alcohol and (c) a polyol having an average hydroxyl functionality of at least about 1.8 to at most about 3.2.

The prepolymer composition (i.e., reaction product) has an amount of isocyanate groups by weight sufficient to react with water in the absence of a supplemental blowing agent to make a foam. A supplemental blowing agent, herein, is a blowing agent other than $CO_2$ generated in situ during the formation of the foam. Supplemental blowing agents include, for example, gases that are used to create a froth (e.g., nitrogen), liquids that volatilize during foam formation (e.g., methylene chloride, methyl chloride, and FREON 113) and solids that release a gas during foam formation (e.g., azo-compounds, such as barium azodicarboxylate).

Generally, the amount of NCO present is about 2 percent to about 20 percent by weight of the prepolymer composition. Preferably the amount of NCO is at least about 5 percent and more preferably at least about 6 percent to preferably at most about 15 percent, more preferably at most about 13 percent, even more preferably at most about 12 percent and most preferably at most about 10 percent by weight of the prepolymer composition.

Even though the prepolymer composition may form a foam without a supplemental blowing agent, one may still be present in the composition to give a desired foam characteristic, such as greater thermal insulation for a foam of a specific thickness. Small quantities of a supplemental blowing agent may be present in the prepolymer composition, such as a low boiling hydrocarbon (e.g., pentane, hexane, heptane, pentene and heptene) directly added carbon dioxide, an azo compound (e.g., azohexahydrobenzodnitrile) or a halogenated hydrocarbon (e.g., dichlorodifluoroethane, vinylidene chloride and methylene chloride). However, the amount of supplemental blowing agent is preferably at most a trace amount and more preferably none at all.

The prepolymer composition contains an amount of diisocyanate monomer of at most about 10 percent by weight of the prepolymer. Preferably the amount of diisocyanate monomer is at most about 6 percent, more preferably at most about 3 percent, even more preferably at most about 2.5 and most preferably at most about 2 percent by weight of the prepolymer composition. Also, the amount of diisocyanate monomer present in the prepolymer composition generally results in very low concentrations of vaporous isocyanate compounds in the surrounding air space when making a foam therefrom. Very low concentrations of isocyanate correspond to levels generally deemed safe to handle without special equipment, such as hoods, when making a foam. For example, the amount of vaporous isocyanate compounds found in the air space is, typically, at most about 5 parts per billion (ppb), preferably at most about 3 ppb, more preferably at most about 2 ppb, even more preferably at most about 1 ppb and most preferably at most about 0 ppb, the parts being parts by weight.

It has been found that the prepolymer composition, when made, and particularly when made, with a low NCO to OH ratio of about 2 to about 5, requires an amount of the polyisocyanate that is capped by a monohydric alcohol sufficient to prevent gelling of the prepolymer composition. Herein, capped means the hydroxyl of the monohydric alcohol has reacted with an NCO of the polyisocyanate to form a urethane linkage. Gelling, herein, is when the prepolymer gels or increases in viscosity, such that the prepolymer composition is impractical to process into a foam. Typically, it is impractical to use a prepolymer composition having a viscosity greater than about 100,000 centipoise. Generally, the monohydric alcohol is provided in a ratio of monohydric alcohol to polyol of at least about 0.1 to at most about 2, based upon the hydroxyl equivalents of the monohydric alcohol and polyol. Too much monohydric alcohol is generally undesirable because foam properties, such as compressive strength, uniformity of cell size and chemical resistance, may be degraded to a point where the foam fails to be useful in applications. Preferably the ratio of monohydric alcohol to polyol is at least about 0.5, more preferably at least about 0.6, most preferably at least about 0.7 to preferably at most about 1.5, more preferably at most about 1 and most preferably at most about 0.7

The prepolymer composition surprisingly is stable (i.e., fails to gel) when stored, for example, for 6 months or more under standard conditions in the industry (e.g., under a dry atmosphere, "i.e. dew point less than about −40° C."). The prepolymer composition is stable even when the composition is made at a low NCO to OH ratio described previously. Preferably the prepolymer composition is stable for at least a year and more preferably at least 2 years.

Method of Making the Prepolymer Composition

Reactants:

Because the prepolymer composition may be made with an organic polyisocyanate containing at least about 20 percent by weight of diisocyanate monomer (e.g., MDI in a polymeric MDI or TDI in polymeric TDI), the organic polyisocyanate may be, for example, an aromatic polyisocyanate, aliphatic polyisocyanate, polymeric isocyanate, aromatic diisocyanate, aliphatic diisocyanate or mixtures thereof. Exemplary polyiisocyanates include m-phenylene diisocyanate, tolylene-2-4-diisocyanate, tolylene-2-6-diisocyanate, hexamethylene-1,6-diisocyanate, tetramethylene-1,4-diisocyanate, cyclohexane-1,4-diisocyanate, hexahydrotolylene diisocyanate, naphthylene-1,5-diisocyanate, methoxyphenyl-2,4-diisocyanate, diphenylmethane-4,4,-diisocyanate, 4,4'biphenylene diisocyanate, 3,3,dimethoxy-4,4'-biphenyl diisocyanate, 3,3,-dimethyl-4-4'-biphenyl diisocyanate, 3,3-dimethyldiphenylmethane-4,4'-diisocyanate, 4,4,'4"-triphenyl methane triisocyanate, polymethylene polyphenylisocyanate and tolylene-2,4,6-triisocyanate, 4,4,-dimethyldiphenylmethane-2,2'5,5'-tetraisocyanate. Preferably the polyisocyanate is diphenylmethane-4,4'-diisocyanate (MDI), tolylene-2-4-diisocyanate, tolylene-2-6-diisocyanate or mixtures thereof. Tolylene-2-4-diisocyanate, tolylene-2-6-diisocyanate and mixtures thereof are generically referred to as TDI. More preferably, the polyisocyanate is a polymeric polyisocyanate formed from MDI, such as those available from The Dow Chemical Company under the PAPI™ trade name. The polymeric polyisocyanate "PAPI 20" is particularly preferred.

Generally, the average measured isocyanate functionality of the polyisocyanate is at least 2 to at most about 6. Preferably the average functionality of the polyisocyanate is at least about 2.5, and more preferably at least about 2.7 to preferably at most about 3.5 and more preferably at most about 3.2. As understood in the art, functionality is the average number of isocyanate groups per molecule in the polyisocyanate.

The polyol used to make the prepolymer composition has an average hydroxyl functionality of at least about 1.8 to at most about 3.2. Preferably the average functionality of the polyol is at most 2.8, more preferably at most about 2.5 and most preferably at most about 2.0. A suitable polyol may be known polyols, such as those described by U.S. Pat. Nos. 3,383,351; 3,823,201; 4,119,586 and 4,148,840, each incorporated herein by reference. Exemplary polyols include polyhydroxyalkane polyols, polyoxyalkylene polyols, alkylene oxide adducts of polyhydroxyalkanes, alkylene oxide adducts of non-reducing sugars and sugar derivitives, alkylene oxide adducts of phosphorus and polyphosphorus acids, alkylene oxide adducts of polyphenols and polyols derived from natural oils, such as caster oil. Preferably the polyols are diols (e.g., propylene glycol), triols or mixtures of these. More preferably the polyol is a diol (i.e., glycol). The polyol is also preferably a diol, triol or mixture thereof of poly (oxyethylene), poly(oxypropylene), poly(oxypropyleneoxyethylene), such as those available under the trade name VORANOL™ from The Dow Chemical Co., Midland, Mich.

The polyols employed may have hydroxyl numbers which vary over a large range. The particular polyol or polyols are selected based upon the desired polyurethane foam properties. In general, the polyols have a hydroxyl number that ranges from about 20 to about 1500. Preferably the hydroxyl number is at least about 25, and more preferably at least about 30 to preferably at most about 600, and more preferably at most about 450. The hydroxyl number (OH number) is defined as the number of milligrams of potassium hydroxide required for the complete hydrolysis of the fully acelated derivative prepared from 1 gram of polyol. The hydroxyl number may also be given by the following equation:

$$\text{OH number} = \frac{(56.1)(1000)}{\text{Equivalent Weight}}$$

wherein (56.1) is the atomic weight of potassium hydroxide, (1000) is the number of milligrams in 1 gram of a polyol sample and equivalent weight is the molecular weight of the the polyol divided by the hydroxyl functionality of the polyol (hydroxyls/polyol molecule)

The monohydric alcohol is an alcohol that has one hydroxyl per molecule. The monohydric alcohol may be any having, for example, from 1 to about 50 carbons (i.e., a $C_1$–$C_{50}$ monohydric alcohol) and preferably from 2 to 20 carbons (i.e., a $C_2$–$C_{20}$ monohydric alcohol). The monohydric alcohol may be substituted with other groups that essentially fail to react with the isocyanate under the conditions to make the prepolymer or foam. Particularly preferred monohydric alcohols include $C_1$–$C_{20}$ unsaturated aliphatic monohydric alcohols. More preferably the monohydric alcohol is selected from the group consisting of ethanol, methanol, butanol (e.g., 1-butanol, 2-butanol and isobutyl alcohol), propanol( e.g., isopropyl alcohol and n-propyl alcohol), EXXAL 12™ ($C_{11}$–$C_{14}$ aliphatic alcohols, available from Exxon Chemical America, Houston Tex.) and mixtures thereof. Most preferably the monohydric alcohol is butanol.

Optional Additives:

The prepolymer composition may be made using a catalyst. Consequently, the prepolymer composition may contain a catalyst. The catalyst may also be added after forming the prepolymer composition, for example, to aid in forming a foam made therefrom. A suitable catalyst includes known catalysts, such as those described by U.S. Pat. No. 4,390,645, at col. 10, lines 14 to 27, incorporated herein by reference. More specifically, representative catalysts include:

(a) tertiary amines, such as trimethylamine, triethylamine, N-n-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo[2,2,2]octane, bis (dimethylaminoethyl)ether, bis(2-dimethylaminoethyl) ether, morpholine,4,4'-(oxydi-2,1-ethanediyl)bis and triethylenediamine;

(b) tertiary phosphines, such as trialkylphosphines and dialkylbenzylphosphines;

(c) chelates of various metals, such as those which can be obtained from acetylacetone, benzoylacetone, trifluoroacetyl acetone, ethyl acetoacetate and the like with metals, such as Be, Mg, Zn, Cd, Pd, Ti, Zr, Sn, As, Bi, Cr, Mo, Mn, Fe, Co and Ni;

(d) acidic metal salts of strong acids, such as ferric chloride, stannic chloride, stannous chloride, antimony trichloride, bismuth nitrate and bismuth chloride;

(e) strong bases, such as alkali and alkaline earth metal hydroxides, alkoxides and phenoxides;

(f) alcoholates and phenolates of various metals, such as $Ti(OR)_4$, $Sn(OR)_4$ and $Al(OR)_3$, wherein R is alkyl or aryl and the reaction products of the alcoholates with carboxylic acids, beta-diketones and 2-(N,N-dialkylamino)alcohols;

(g) salts of organic acids with a variety of metals, such as alkali metals, alkaline earth metals, Al, Sn, Pb, Mn, Co, Ni and Cu including, for example, sodium acetate, stannous octoate, stannous oleate, lead octoate, metallic driers, such as manganese and cobalt naphthenate;

(h) organometallic derivatives of tetravalent tin, trivalent and pentavalent As, Sb and Bi and metal carbonyls of iron and cobalt and (i) mixtures thereof.

Catalysts are typically used in small amounts. For example, the total amount of catalyst present in the prepolymer composition may be about 0.0015 to about 5 percent by weight. The catalyst present may be added after the prepolymer composition is formed or may be used to reduce the time to form the prepolymer composition. Catalysts, when used to form the prepolymer composition, are generally employed in small amounts, such as from about 0.01 percent to about 1 percent by weight of the prepolymer composition. When a catalyst is used to form the prepolymer composition, generally only small amounts of catalyst remain, which are insufficient alone to adequately catalyze the reaction to form a foam.

The prepolymer composition may be made in the presence of a plasticizer and, consequently, contain a plasticizer. The plasticizer may also be added after the prepolymer composition is made. The plasticizer may be, for example, present in the prepolymer composition to alter the properties of the foam made from the prepolymer composition or reduce the viscosity of the composition, making it easier to process and handle. Suitable plasticizers may include those known in the art. Examples of plasticizers include phthalates (e.g., dioctyl phthalate, diisooctyl phthalate, dimethyl phthalate, dibutyl phthalate and mixtures of phthalates, such as those sold under the trade name PALATINOL™, available from BASF Corporation, Mt Olive, N.J.), phosphates (e.g., tributyl phosphate, triphenyl phosphate and cresyl diphenyl phosphate), chlorinated biphenyls and aromatic oils. Preferably the plasticizer is one available under the trade name PALITINOL™ and more preferably PALATINOL 711P™ from BASF Corporation, Mt. Olive, N.J. The amount of plasticizer, when employed, may range over a wide range, for example, depending on the foam properties desired. Generally, the plasticizer, when present, ranges from about 1 percent to at most about 50 percent by weight of the prepolymer composition. When making a rigid foam, the prepolymer composition preferably contains a plasticizer.

The prepolymer composition may also be made in the presence of a surface active agent, such as those described by U.S. Pat. No. 4,390,645, at col. 10, lines 28 to 43, previously incorporated by reference. The surface active agent may also be added after the prepolymer composition is formed and said agent, for example, may be useful in cell formation and cell stabilization when the prepolymer is used to form a foam. Examples of surface active agents include nonionic surfactants and wetting agents, such as those prepared by the sequential addition of propylene oxide and then ethylene oxide to propylene glycol, the solid or liquid organosilicones, polyethylene glycol ethers of long chain alcohols, tertiary amine or alkylolamine salt of long chain alkyl acid sulfate esters, alkyl sulfonic ester and alkyl arylsulfonic acids. The surface active agents prepared by the sequential addition of propylene oxide and then ethylene oxide to propylene glycol and the solid or liquid organosilicones are preferred. Liquid organosilicones, which are not hydrolyzable, are more preferred. Examples of non-hydrolyzable organosilicones include those available under the trademarks "DOW CORNING 5043," "DOW CORNING 5169," "DOW CORNING 5244" and "DOW CORNING DC198," available from Dow Corning Corp., Freeland, Mich. and "Y-10515," available from Union Carbide Corp., Danbury Conn. Surface active agents are typically used in small amounts when making a foam. Consequently, the surface active agent, when present in the prepolymer composition, is typically present in an amount of about 0.0015 to about 1 percent by weight of the prepolymer composition.

The prepolymer composition may also be made in the presence of an additive, such as those known in the art, including, for example, an odor mask, a flame retardant, fungicide, UV stabilizer, antistatic agent, filler, pigment and cell opener. Examples of a flame retardant include phosphoruous compounds, halogen containing compounds and melamine. These additives may also be added to the prepolymer composition after it has been formed. Examples of fillers and pigments include calcium carbonate, titanium dioxide, iron oxide, chromium oxide, azo/diazo dyes, phthalocyanines, dioxazines and carbon black. Examples of UV stabilizers include hydroxybenzotriazoles, zinc dibutyl thiocarbamate, 2,6-ditertiary butylcatechol, hydroxybenzophenones, hindered amines and phosphites. Examples of a cell opener include silicon-based antifoamers, waxes, finely divided solids, liquid perfluorocarbons, paraffin oils and long chain fatty acids. Generally, these additives, when present, are employed in small amounts, such as from about 0.01 percent to about 1 percent by weight of the prepolymer composition.

Forming the Prepolymer Composition:

The prepolymer composition may be formed by contacting the organic polyisocyanate, monohydric alcohol and polyol at a ratio of NCO to hydroxyl of at least about 2 to at most about 5, where the monohydric alcohol and polyol are provided in a ratio of monohydric alcohol to polyol of at least about 0.1 to at most about 2, based upon the hydroxyl equivalents of the monohydric alcohol and polyol. Preferably the organic polyisocyanate, monohydric alcohol and polyol provide a NCO:OH ratio of at least about 2.5 to preferably at most 4.0 and more preferably less than about 3. The ratio of monohydric alcohol to polyol is preferably at least about 0.5 and more preferably at least about 0.6 to preferably at most about 1.5, more preferably at most about 1 and most preferably at most about 0.9.

The organic polyisocyanate, monohydric alcohol, polyol and any optional additive may be contacted for any time and temperature sufficient to form the prepolymer composition. The polyisocyanate, monohydric alcohol, polyol and optional additive or additives may be contacted by any convenient method, such as those known in the art, provided that the reactants and additives are sufficiently mixed to make a substantially homogeneous reactant mixture. The time the reactants and additives may be contacted to form the prepolymer composition may vary over a large range due to, for example, the presence of a catalyst. Generally, the reaction time is at least about 1 minute to at most about 48 hours. The temperature the reactants are contacted at may also range over a large range, but generally are limited to where one or more of the reactants decompose or the reaction is so slow that the process is rendered impracticable. Preferably the temperature is at least about 0° C. to about 250° C. The reactants are generally contacted under a dry atmosphere, such as those known in the art (e.g., dry air or dry nitrogen, "i.e. gas having a dew point of less than about –40° C.").

Method of Forming a Foam from the Prepolymer Composition

A foam prepared from the prepolymer composition may be made by any suitable method, such as those known in the art. Examples of methods include those described in U.S. Pat. Nos. 4,390,645; 2,866,744; 3,755,212; 3,849,156 and 3,821,130, each incorporated herein by reference. Suitable techniques include, for example, stirring the prepolymer composition, adding a foaming reactant comprised of water, mixing these for a short time, pouring the mixture into a mold and allowing the foam to form. Preferably the foaming reactant is pumped, for example, to a mixing head where it is mixed with the prepolymer composition in a very short time, such as at most about 5 seconds, more preferably at most about 2 seconds and most preferably at most about 1 second, and subsequently dispensed, for example, into a cavity or mold.

The foaming reactant may contain other compounds besides water, such as the optional additives and the polyol previously described. Preferably the foaming reactant is comprised of water, a viscosity thickener (e.g., methyl cellulose, guar gum, cellulose ethers, clay, treated fillers, surface treated clay, fumed silica, starch, monomix, polyols and corn syrup) and a catalyst, such as one previously described. The water of the foaming reactant is preferably distilled water. Most preferably the water is distilled and deionized water having essentially no impurities.

When making a foam, the foaming reactant may be reacted with the prepolymer composition at any volume ratio sufficient to make the foam. Generally, the volume ratio of the foaming reactant to prepolymer composition is set by the stoichiometery of NCO to OH desired and ease of processing. Because the NCO content of the prepolymer composition is typically less than, for example, MDI or TDI, the volume of the foaming reactant is typically at most about 10 percent by volume of the entire foam mixture (i.e., the volume of the foaming reactant and prepolymer composition). Preferably the foaming reactant is at most about 7.5 percent by volume of the foam mixture and more preferably at most about 5 percent by volume of the foam mixture.

Even though the viscosity of the foaming reactant may vary over a wide range, it is desirable for the foaming reactant viscosity to be similar to the viscosity of the prepolymer composition, for example, to enhance mixing. Preferably the viscosity of the foaming reactant has a viscosity of at least about 50 percent to at most about 500 percent of the viscosity of the prepolymer composition. The viscosity of the prepolymer composition may be modified, for example, by the plasticizers and thickeners previously described. The amount of these should not be so great that the properties of the resultant foam are degraded substantially.

When forming a foam from the prepolymer composition, where the foaming reactant is at most about 10 percent by volume of the total foaming mixture, it is preferred that the prepolymer composition and foaming reactant are two separate streams that are contacted and uniformly mixed and dispensed from a mixing head. Suitable mixing heads include those commercially available for making polyurethane foams, such as the one incorporated in MODEL N-4400 foaming apparatus, available from Jesco Products Company, Sterling Heights, Mich.

Generally, the time to form the foam is as short as practicable and may be from about 1 second to about 48 hours. Preferably the time to form the foam is from about 1 to 60 seconds. The temperature of the reaction, generally, is great enough for the foam to be formed but not so great that the polyurethane foam or components of the foam, for example, decompose. Generally, the temperature ranges from room temperature up to about 300° C.

When forming the foam, the only blowing agent is generally the $CO_2$ produced by the water isocyanate reaction. A supplemental blowing agent may be present, such as a low boiling hydrocarbon (e.g., pentane, hexane, heptane, pentene and heptene), directly added carbon dioxide, an azo compound (e.g., azohexahydrobenzodnitrile or a halogenated hydrocarbon (e.g., dichlorodifluoroethane, vinylidene chloride and methylene chloride). However, preferably the amount of these supplemental blowing agents, other than the $CO_2$ produced by the water-isocyanate reaction, is at most a trace amount and more preferably none at all.

The polyurethane foam that is formed by the above method may have a large range of properties depending on the particular components used (e.g., polyol). For example, the foam may have a bulk density of about 1 to about 50 pounds per cubic foot but is preferably about 1 to 5 pounds per cubic foot. The foam may also have a wide range of compressive strengths. For example, the foam may have a compressive strength of about 1 to about 5000 pounds per square inch (psi). Preferably the compressive strength is about 5 to about 20 psi as determined by ASTM D1621 A.

Below are specific examples within the scope of the invention and comparative examples. The specific examples are for illustrative purposes only and in no way limit the invention described herein.

EXAMPLES

Example 1

(Formation of the Prepolymer)

The prepolymer is prepared as follows. In a jacketed 1000 mL glass reaction flask, 352 part by weight of polymeric MDI, available from The Dow Chemical Company under the trade name PAPI 20, are agitated and heated to about 70° C. under a constant blanket of nitrogen. The PAPI 20 has an average molecular weight of about 400, functionality of about 3.2, isocyanate equivalent weight of about 141 and NCO percent by weight of about 30. During heating, the PAPI 20 is stirred with a paddle (two 2.5 inch paddles) stirrer rotated at about 500 rpm (revolutions per minute). The reactor and its content are heated by flowing water heated to about 70° C. through the jacket of the reactor.

Once the reactor and its contents reached about 70° C., agitation is stopped and the following are added to the reaction flask:

336 parts by weight PALATINOL 711P.

84 parts by weight VORANOL 220-260, 20 parts by weight 1-Butanol, 4 parts by weight DMDEE Catalyst, where PALATINOL 711P is a mixture of Phthlate Esters, available from BASF Corp.; VORANOL 220-260 is a polyether polyol, available from The Dow Chemical Company and the DMDEE is a morpholine,4,4'-(oxydi-2,1-ethanediyl)bis catalyst, available from Huntsman Corporation, Austin, Tex. The VORANOL 220-260 is a polyether polyol initiated by polypropylene that has an average molecular weight of about 425, average functionality of about 2 and hydroxyl number of about 260. After adding these 4 ingredients, the contents of the reaction flask are agitated at 70° C., as previously described. Periodically (about every 30 minutes), the amount of NCO of the reaction mixture is determined by dissolving a sample of prepolymer in 20 ml of tetrahydrofuran, then adding 25 ml of a 1.5 weight percent dibutylamine in toluene solution and stirring this titration mixture for 15 minutes. Once this is complete, 50 mL of 2-propanol is added to the titration mixture and is stirred for 5 more minutes. Using a 682 Titroprocessor, available from Brinkmann Instruments, Westbury, N.Y., the percent by weight of NCO of the titration mixture is determined by titrating with a 0.5N (Normal) Hydrochloric Acid solution.

Once the theoretical amount of NCO (i.e., about 9.62 percent by weight) is reached (i.e., in this Example about 60 minutes), agitation is stopped and the prepolymer formed is put into a metal can under a nitrogen blanket. The measured NCO is 9.40 percent and the viscosity at 25° C. is 3500 centipoise, as measured by a Brookfield viscometer using a #5 Spindle at 10 RPM.

Example 2

(Foam Formed from Prepolymer of Example 1)

100 Grams of the prepolymer of Example 1 is heated to and maintained at 80° C. in a plastic container. To the heated prepolymer, 0.5 mL of DC198 silicone surfactant is added by a disposable syringe and stirred with a wooden tongue depressor until the surfactant is well dispersed. Then 0.5 mL of bis(2-dimethylaminoethyl) ether catalyst (DABCO BL-19, available from Air Products and Chemicals Inc., Allentown, Pa.) is added by disposable syringe and stirred with a wooden tongue depressor until the catalyst is well dispersed. Finally, 2.1 mL of water is added by disposable syringe and the contents of the container are quickly mixed for 3 seconds at 2500 rpm with a paddle stirrer described previously. The resultant foaming mixture is quickly poured into a 16 ounce paper container.

The following describes the characteristics of the foam.

Cream Time: 2 sec

Gel Time: 8 sec

Tack-Free Time: 15 seconds

Free Rise Density: 2.2 pounds per cubic foot (pcf)

Foam Quality: The foam had no wet spots or regional richness of foam components and a homogeneous uniform fine cell structure without any apparent mixing striations Water Absorption: The foam has an integral skin and essentially fails to absorb water after being immersed in water for 24 hours, as determined by standard SAE J315

Dimensional Stability: The foam, 20 min after foam manufacture, has a maximum percent volume change of 5 percent following a 15 minute heat treatment at 120° C.

Compressive Strength: About 10 psi as per ASTM D1621 A

Lap Shear/Panel Adhesion: The foam displays excellent adhesion to electrocoated steel under conditions known in the art for painting automobiles.

Example 3

(Foam Formed from Prepolymer of Example 1)

First, a foaming reactant is formed by the following method. 394 Parts by weight(pbw) of deionized water at 90° C. is added to 6 pbw of METHOCEL K100M Food Grade, available from The Dow Chemical Company, Midland, Mich., in a jacketed 1000 mL glass reaction flask previously described. The water-METHOCEL is mixed at 90° C. and 500 rpm, as described in Example 1, until the METHOCEL is completely dispersed (approx. 1 hr). After the METHOCEL is completely dispersed, the reactor is cooled to 10° C. After cooling to about 10° C., 400 pbw of Dabco BL-19 catalyst is added and subsequently mixed for 60 min. The resultant foaming reactant is removed and stored in a metal quart container.

The prepolymer of Example 1 and the foaming reactant are then mixed and dispensed using a Jesco Model N4400 foaming apparatus. The operating conditions of the apparatus are as follows. The prepolymer composition at 80° C. and the foaming reactant at 40° C. are pumped to the mixing head at a prepolymer composition to foaming reactant volume ratio of about 24:1 and at about 75 cc/sec. The mixing head also called "heated foam impingement applicator with trigger handle" is heated and maintained at 60° C.

The foam characteristics are the same as those of Example 2, except as follows:

Cream time: Instantaneous

Gel Time: 2–4 seconds

Tack Free Time: 6 seconds cl Comparative Example 1

A prepolymer composition is made using the materials shown below. The procedure used is the same as described in Example 1. The theoretical percent by weight NCO is 13.01 percent. The measured NCO content was 12.51 percent by weight.

| Material | Wt % |
|---|---|
| PAPI 20 | 56.2 |
| Palatinol 711P | 23.0 |
| Voranol 220–260 | 18.8 |
| DMDEE | 2.0 |

The resulting prepolymer is unstable as shown by the below viscosity data measured at 25° C., as described previously.

24 hrs after production: 34,000 centipoise 48 hrs: 48,000 centipoise 72 hrs: 54,300 centipoise 96 hrs: 62,700 centipoise

What is claimed is:

1. A polyisocyanate prepolymer composition comprising the reaction product of (a) an organic polyisocyanate having an average isocyanate functionality of at least 2 and containing at least about 20 percent by weight of a diisocyanate monomer, (b) a monohydric alcohol and (c) a polyol having an average hydroxyl functionality of at least about 1.8 to at most about 3.2, wherein the prepolymer composition has (i) an amount of isocyanate groups by weight sufficient to react with water in the absence of a supplemental blowing agent to make a foam, (ii) at most about 10.0 percent by weight of the diisocyanate monomer and (iii) an amount of the polyisocyanate that is capped by the monohydric alcohol sufficient to prevent gelling of the prepolymer composition.

2. The prepolymer composition of claim 1 wherein the monohydric alcohol is a $C_1$ to $C_{50}$ alcohol.

3. The prepolymer composition of claim 2 wherein the monohydric alcohol is a $C_2$ to $C_{20}$ alcohol.

4. The prepolymer composition of claim 3 wherein the monohydric alcohol is selected from the group consisting of 1-butanol, 2-butanol, isobutyl alcohol and mixtures of $C_{11}-C_{14}$ aliphatic alcohols.

5. The prepolymer composition of claim 1 wherein the NCO content is at least about 2 to at most about 20 percent by weight of the prepolymer composition.

6. The prepolymer composition of claim 5 wherein the NCO content is at most about 10 percent by weight of the prepolymer composition.

7. The prepolymer composition of claim 6 further comprising a plasticizer.

8. The prepolymer composition of claim 1 further comprising a plasticizer.

9. The prepolymer composition of claim 8 wherein the plasticizer is a dialkyl phthalate or mixture of dialkyl phthalates.

10. The prepolymer composition of claim 8 wherein the plasticizer is selected from the group consisting of dioctyl phthalate, diisooctyl phthalate, dimethyl phthalate, dibutyl phthalate and mixtures thereof.

11. The prepolymer composition of claim 1 wherein the average hydroxyl functionality of the polyol is at most about 2.5.

12. The prepolymer composition of claim 11 wherein the average hydroxyl functionality of the polyol is at most about 2.2.

13. The prepolymer composition of claim 12 wherein the polyol has a hydroxyl number 20 to about 1000.

14. The prepolymer composition of claim 13 wherein the polyol has an average hydroxyl functionality of at least about 1.8 to at most about 2.2 and a hydroxyl number of at least about 20 to at most about 1500.

15. The prepolymer composition of claim 1 wherein the amount of the diisocyanate monomer is at most about 5 percent by weight of the prepolymer composition.

16. The prepolymer composition of claim 15 wherein the amount of the diisocyanate monomer is at most about 4 percent by weight of the prepolymer composition.

17. The prepolymer composition of claim 1 wherein the prepolymer composition is formed from a polymeric MDI having an isocyanate functionality of at least about 2.5 to at most about 3.2 and having at least about 20 percent to at most about 40 percent by weight MDI.

18. The prepolymer Composition of claim 17 wherein the isocyanate functionality of the polymeric MDI is greater than or equal to 2.8 to at most about 3.2.

19. The prepolymer composition of claim 1 wherein the polyisocyanate, monohydric alcohol and polyol provide an NCO to OH ratio of at least about 2 to at most about 5.

20. The prepolymer composition of claim 19 wherein the ratio of NCO to OH is at least about 2 to at most about 4.

21. The prepolymer composition of claim 19 wherein the ratio of NCO to OH is at least about 2.5 to less than 3.

22. The prepolymer composition of claim 1 wherein the monohydric alcohol and polyol are provided in a ratio of monohydric alcohol to polyol of at least about 0.1 to at most about 2, based upon the hydroxyl equivalents of the monohydric alcohol and polyol.

23. The prepolymer composition of claim 22 wherein the ratio of monohydric alcohol to polyol is at least about 0.5 to at most about 1.5.

24. The prepolymer composition of claim 23 wherein the ratio of monohydric alcohol to polyol is at most about 1.

25. The prepolymer composition of claim 24 wherein the the ratio of monohydric alcohol to polyol is at least about 0.6 to at most about 0.9.

* * * * *